United States Patent

Tanaka et al.

[11] Patent Number: 6,127,759
[45] Date of Patent: Oct. 3, 2000

[54] MOTOR FOR AN ELECTRIC POWER STEERING ASSEMBLY

[75] Inventors: Toshinori Tanaka; Kiyohide Okamoto; Akihiro Daikoku; Kyouhei Yamamoto, all of Tokyo, Japan

[73] Assignee: Mitsubishi Denki Kabushiki Kaisha, Tokyo, Japan

[21] Appl. No.: 09/328,488

[22] Filed: Jun. 9, 1999

[30] Foreign Application Priority Data

Nov. 30, 1998 [JP] Japan .................................. 10-340103

[51] Int. Cl.[7] .................................................. H02K 39/08
[52] U.S. Cl. ........................ 310/233; 310/234; 310/235; 310/249; 310/264; 310/179; 310/198
[58] Field of Search .................................. 310/233, 234, 310/235, 249, 264, 179, 198

[56] References Cited

U.S. PATENT DOCUMENTS

| 3,668,449 | 6/1972 | King | 310/236 |
| 4,716,330 | 12/1987 | Heyraud | 310/233 |
| 4,792,714 | 12/1988 | Schieter | 310/234 |
| 4,977,343 | 12/1990 | Wang | 310/42 |
| 5,717,270 | 2/1998 | Lau et al. | 310/220 |
| 5,760,517 | 6/1998 | Stolpmann | 310/233 |
| 5,925,962 | 7/1999 | Kobman et al. | 310/237 |

FOREIGN PATENT DOCUMENTS 61-112556 5/1986 Japan .

*Primary Examiner*—Nick Ponomarenko
*Assistant Examiner*—Thanh Lam
*Attorney, Agent, or Firm*—Sughrue, Mion, Zinn, Macpeak & Seas, PLLC

[57] ABSTRACT

A motor for an electric power steering assembly comprises permanent magnets constituting four or more poles secured to the inner wall of a yoke, a shaft disposed inside the yoke so as to be able to rotate freely, an armature secured to the shaft having a winding composed of wiring wound by a lap winding method into slots formed on the outer circumferential surface of a core so as to extend in the axial direction thereof, a commutator comprising a plurality of commutator segments secured to an end portion of the shaft, brushes disposed singly on the positive side and the negative side of the commutator so as to contact the surface thereof; and equalizing connectors connecting commutator segments which should have the same electric potential to each other.

10 Claims, 15 Drawing Sheets

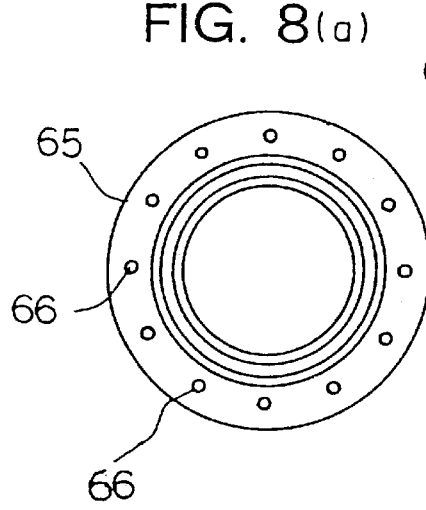
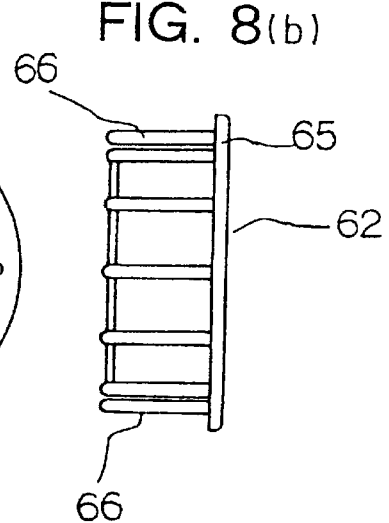
FIG. 8(a)  FIG. 8(b)
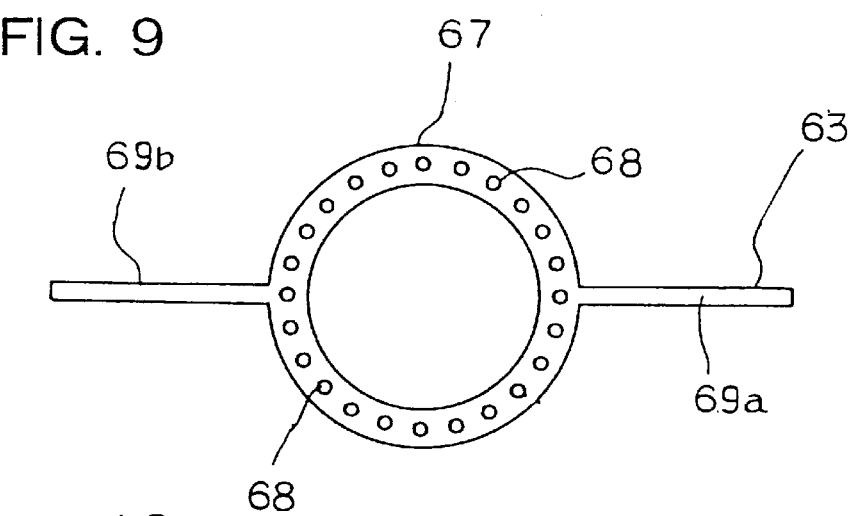
FIG. 9
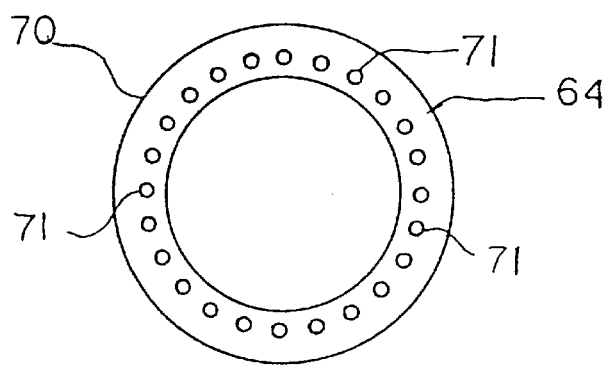
FIG. 10

MOTOR FOR AN ELECTRIC POWER STEERING ASSEMBLY

BACKGROUND OF THE INVENTION

1. Field of the Invention

The present invention relates to a motor for an electric power steering assembly for assisting the steering force of an automotive steering wheel.

2. Description of the Related Art

FIG. 14 is a cross-section of a conventional electric power steering assembly. The electric power steering assembly comprises: an electric power steering assembly motor 1 (hereinafter "electric motor") for generating a rotational torque; and an electromagnetic clutch 2 connected to the electric motor 1 for engaging and disengaging the rotational torque from the electric motor 1.

The electric motor 1 comprises: a cylindrical yoke 3; permanent field magnets 4 secured facing each other inside the yoke 3 to form a 4-pole magnetic field portion; a shaft 7 supported inside the yoke 3 by a first bearing 5 and a second bearing 6 so as to be able to rotate freely; an armature 8 secured to the shaft 7; a commutator 9 secured to one end of the shaft 7; brushes 11 placed in contact with the surface of the commutator 7 by the elastic force of springs 10; a brush holder 12 for holding the brushes 11; a non-magnetic aluminum housing 14 connected to the yoke 3 by a clamping bolt 19 for securing the brush holder 12 by means of a brush holder clamping bolt 13; and a grommet 16 through which a lead wire 15 passes.

The armature 8 comprises: a core 17 having twenty-two slots extending in the axial direction; and a winding 18 constructed by winding wiring into the slots by a lap winding method.

The electromagnetic clutch 2 comprises: a clutch stator 20 secured to the housing 14 by a clutch clamping bolt 21; a clutch coil 22 disposed within the clutch stator 20; a boss 23 disposed on the end of the shaft 7 by means of the second shaft 6 so as to be able to rotate freely; a drive rotor 24 secured to the shaft 7; and a doughnut-shaped disk 25 secured to the boss 23 by means of a spring member 26.

In an electric power steering assembly of the above construction, the armature 8 is rotated together with the shaft 7 by electromagnetic action due to an electric current supplied to the winding 18 by means of the brushes 11 contacting the commutator segments 9.

At the same time, an electromagnetic circuit A is formed among the clutch stator 20, the drive rotor 24, and the disk 25, each being composed of magnetic materials, by passing an electric current through the clutch coil 22. The spring member 26 is stretched towards the clutch stator 20 side by the action of this electromagnetic circuit, whereby the disk is attracted and fastened to the drive rotor 24 and the drive unit 24 becomes integrated with the boss 23.

Consequently, because the drive rotor 24 is fastened to the shaft 7, the torque from the shaft 7 is transmitted to the drive rotor 24, the boss 23, and a worm shaft (not shown) bound by splining to the boss 23, thereby assisting the steering force on the steering wheel.

Furthermore, if a shock from the wheels acts on the electric power steering assembly while the torque assisting the steering force is being transmitted, slippage occurs between the disk 25 and the drive rotor 24, and the boss 23 is rotated relative to the shaft 7, absorbing the shock.

One problem with the above electric motor is that differences may arise in the electromotive force induced within the circuits of the winding 18 of the armature 8 due to imbalances in the electromagnetic circuit of the yoke 3, eccentricities in the armature 8, non-uniform current flowing through the brushes 11, etc., giving rise to circulating currents within the winding 18 flowing through the brushes 11, and as a result the deterioration of the commutating action of the brushes 11 and the increase in commutation sparks generated by the brushes 11 cause an increase in temperature, lead to a shortened working life of the brushes 11 and the commutator 9, and increase torque ripples.

FIG. 15 is a winding diagram for an electric motor 42 wherein commutator segments 30 of a commutator 9 which should have the same electric potential are electrically connected to each other using equalizing connectors 31 to prevent the occurrence of the above circulating currents, and FIG. 16 is an electric circuit diagram for the winding diagram in FIG. 15.

Equalizing connectors 31 connect each of the commutator segments 30 such that:

a first commutator segment 30a is connected to a twelfth commutator segment 30l;

a second commutator segment 30b is connected to a thirteenth commutator segment 30m;

a third commutator segment 30c is connected to a fourteenth commutator segment 30n;

a fourth commutator segment 30d is connected to a fifteenth commutator segment 30o;

a fifth commutator segment 30e is connected to a sixteenth commutator segment 30p;

a sixth commutator segment 30f is connected to a seventeenth commutator segment 30q;

a seventh commutator segment 30g is connected to an eighteenth commutator segment 30r;

an eighth commutator segment 30h is connected to a nineteenth commutator segment 30s;

a ninth commutator segment 30i is connected to a twentieth commutator segment 30t;

a tenth commutator segment 30j is connected to a twenty-first commutator segment 30u; and an eleventh commutator segment 30k is connected to a twenty-second commutator segment 30x.

Furthermore, these figures show a first brush 11a in contact with the first commutator segment 30a and the second commutator segment 30b, and a second brush 11b in contact with the sixth commutator segment 30f, the seventh commutator segment 30g, and the eighth commutator segment 30h. They also show a third brush 11c in contact with the twelfth commutator segment 30l and the thirteenth commutator segment 30m, and a fourth brush 11d in contact with the seventeenth commutator segment 30q, the eighteenth commutator segment 30r, and the nineteenth commutator segment 30s.

FIG. 17 is an electric circuit diagram for an electric motor 40 comprising a lap winding, six poles, twenty-four slots, and six brushes 35a to 35f. Commutator segments 33a to 33z which should have the same electric potential are electrically connected to each other using equalizing connectors 34. A winding diagram for the motor for an electric power steering assembly in FIG. 17.

FIG. 18 is a winding diagram for an electric motor 41 comprising a lap winding, four poles, twenty-two slots, and four brush main bodies 36a to 36d. Commutator segments 38a to 38x which should have the same electric potential are electrically connected to each other using equalizing connectors 37. Each of the brush main bodies 36a to 36d comprises three brush portions 39.

In an electric motor 42 of the above construction, there are four brushes 11, leading to problems of torque loss and loud brush noise due to friction and resistance to the sliding of the brushes 11.

Furthermore, another problem is that when the number of brushes 11 is large, the probability that the contact between the brushes 11 and the commutator segments 30 will become unstable is that much greater, thereby increasing torque ripples and making the feel of the steering wheel unpleasant to the driver.

In addition, in the electric motor 42 above, the first brush 11a and the third brush 11c on the positive brush side have normally have the same electric potential as each other, and an equivalent electric current should flow through the first brush 11a and the third brush 11c. However, because currents of different amperage may flow through the first brush 11a and the third brush 11c due to irregularities in the voltage drop and resistivity of the contacts at the first brush 11a and the third brush 11c, irregularities in the resistance in the wires leading to the first brush 11a and the third brush 11c, etc., the brush size of the first brush 11a and the third brush 11c on the positive brush side must be designed with the magnitude of their respective current share in mind, which means that the size of the motor 42 cannot be reduced.

The electric motor 40 comprising a lap winding, six poles, twenty-four slots, and six brushes 35a to 35f suffers from the same problems.

Furthermore, in the electric motor 41 shown in FIG. 18, although the influence of the above irregularities is reduced because each of the brush main bodies 36a to 36d comprises three brush portions 39, in practice, this construction is only adopted in large electric motors and cannot be adopted in a motor for an electric power steering assembly requiring reduced size.

SUMMARY OF THE INVENTION

The present invention aims to solve the above problems and an object of the present invention is to provide a motor for an electric power steering assembly capable of improving the feel of the steering wheel to the driver by reducing torque loss and brush noise due to friction and resistance to the sliding of the brushes and reducing torque ripples, as well as enabling size to be reduced by a simple construction.

To this end, according to the present invention, there is provided a motor for an electric power steering assembly comprising: a yoke; a multi-polar magnetic field portion composed of at least four poles secured to the inner wall of the yoke; a shaft disposed within the yoke so as to be able to rotate freely; an armature secured to the shaft having a winding constructed by lap winding wiring into slots formed on the outer circumferential surface of a core so as to extend in the axial direction thereof; a commutator comprising a plurality of commutator segments secured to an end portion of the shaft; brushes disposed singly on the positive side and the negative side of the commutator so as to contact the surface thereof; and equalizing members connecting the commutator segments which should have the same electric potential to each other.

BRIEF DESCRIPTION OF THE DRAWINGS

FIG. 8(a) is a front elevation of a base;

FIG. 8(b) is a side elevation of the base in FIG. 8(a);

FIG. 9 is front elevation of a terminal which is an equalizing member;

FIG. 10 is a front elevation of an insulating plate;

DETAILED DESCRIPTION OF THE PREFERRED EMBODIMENTS

Embodiment 1

Figure 1:
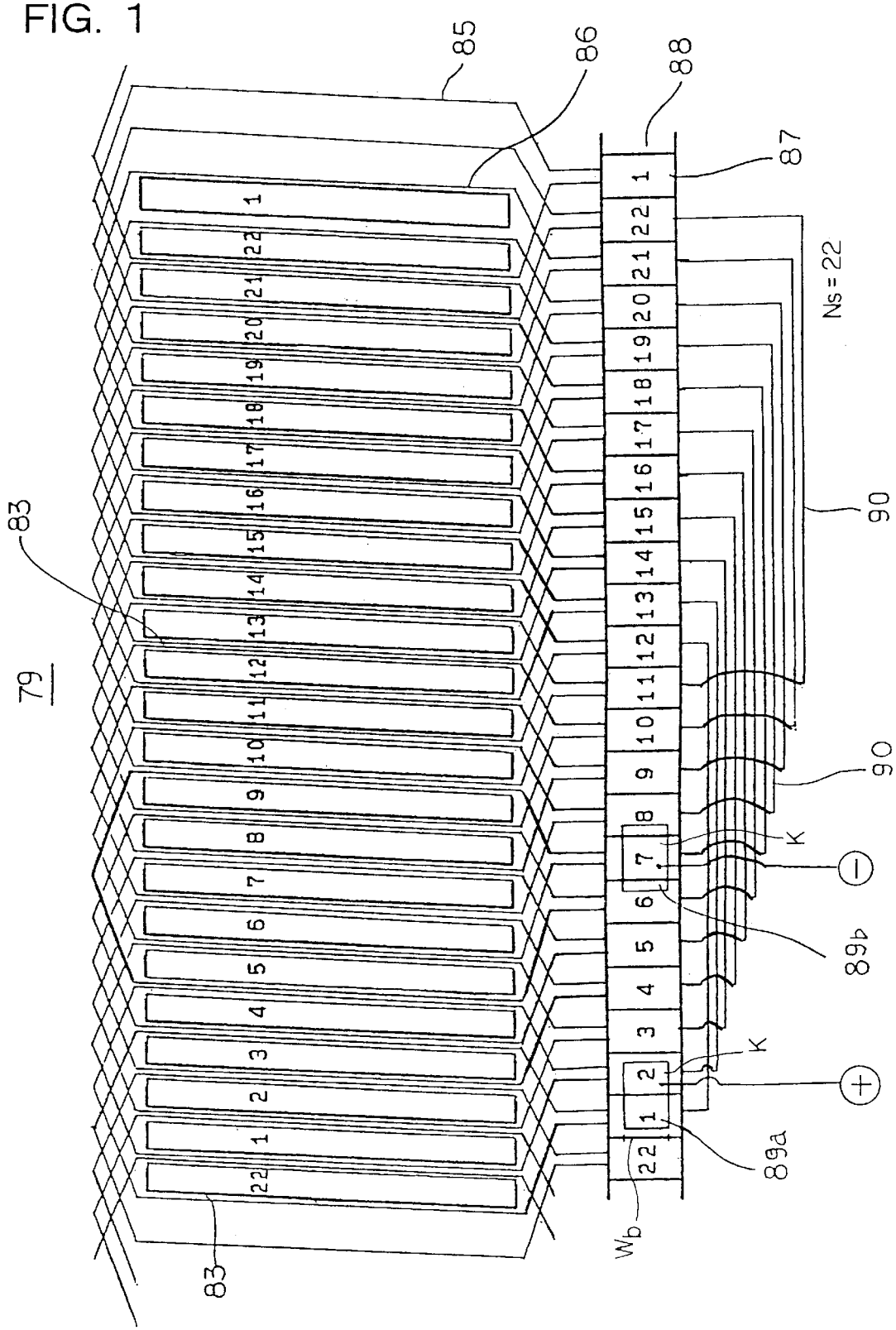
FIG. 1 is a winding diagram for a motor for an electric power steering assembly according to Embodiment 1 of the present invention.
Figure 2:
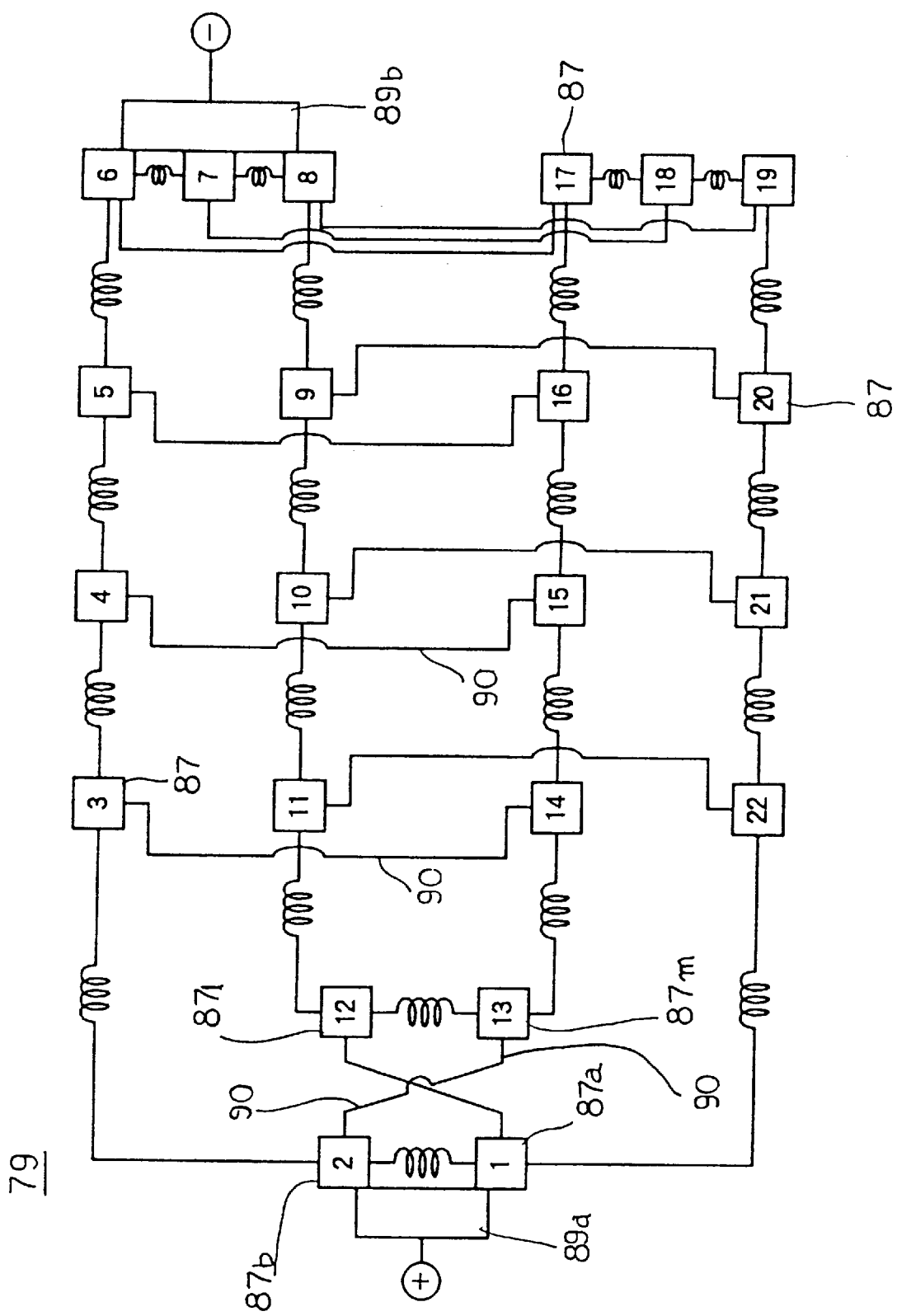
FIG. 2 is an electric circuit diagram for the motor for an electric power steering assembly in FIG. 1.
Figure 3:
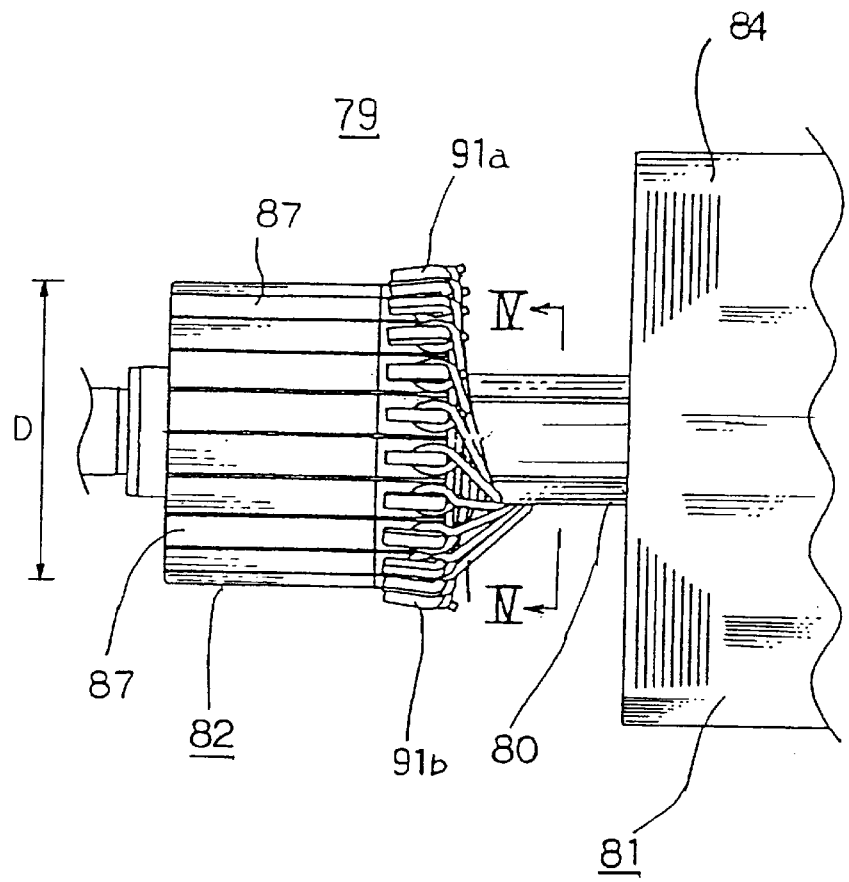
FIG. 3 is a partial side elevation of the motor for an electric power steering assembly in FIG. 1.
Figure 4:
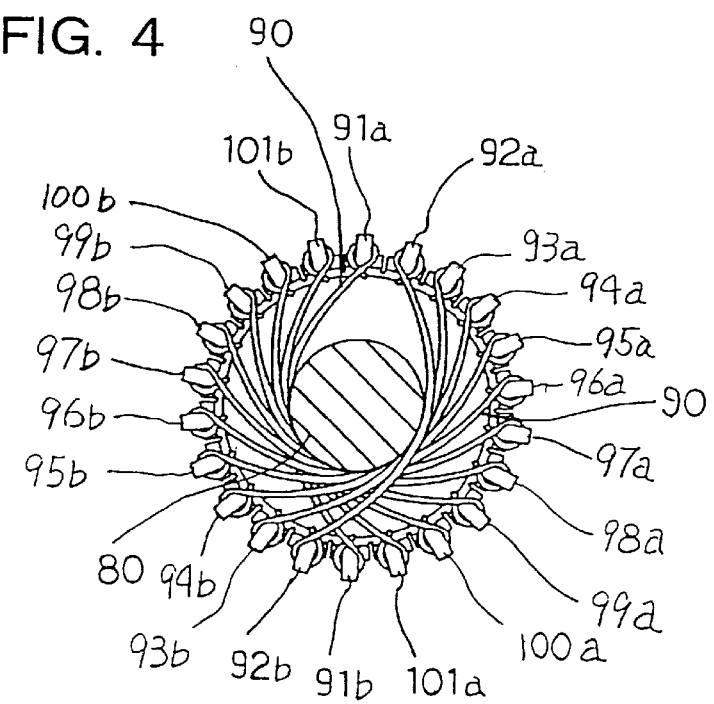
FIG. 4 is a cross-section of the motor for an electric power steering assembly in FIG. 3 taken along line IV—IV.

FIGS. 1 to 4 show a motor for an electric power steering assembly (hereinafter simply "electric motor") according to Embodiment 1, FIG. 1 being a winding diagram therefor, FIG. 2 an electric circuit diagram therefor, FIG. 3 a partial side elevation thereof, and FIG. 4 a cross-section taken along line IV—IV in FIG. 3.

This electric motor 79 comprises: a cylindrical yoke; four permanent magnets composed of ferrite spaced circumferentially and secured inside the yoke to form a magnetic field portion; a shaft 80 disposed inside the yoke by bearings so as to be able to rotate freely; an armature 81 secured to the shaft 80; and a commutator assembly 82 disposed at one end of the armature 81. Moreover, the yoke and the permanent magnets are not shown.

The armature 81 comprises: a core 84 having twenty-two slots 83 extending in the axial direction; and a winding 86 composed of wiring 85 composed of round enamel-coated copper wire wound into the slots. The winding 86 is constructed by a so-called "lap-winding method" in which the wiring 85 is wound ten turns then offset by one slot and the wiring 85 wound another ten turns, and so on repeatedly.

The commutator assembly 82 comprises: a commutator 88 having twenty-two commutator segments 87 arranged in the circumferential direction secured to an end portion of the shaft 80; a first brush 89a and a second brush 89b disposed facing each other which contact the surface of the commutator 88 by means of the elastic force of springs; and equalizing connectors 90 preventing the occurrence of the circulating currents flowing through the brushes 89 by electrically connecting to each other hooks 91a to 101b of commutator segments 87 which should have the same electric potential.

One end of an equalizing connector 90 being an equalizing member is fastened to a hook 91 a of a commutator segment 87, and the other end is fastened to a hook 91b opposite the first hook 91a. Similarly, one end of each of the ten other equalizing connectors 90 is fastened to one of the hooks 92a to 101a, and the other end thereof is fastened to one of the hooks 92b to 101b, respectively. Each of these equalizing connectors 90 is in close contact with the end surface of the commutator assembly 82 facing the armature 81.

Figure 16:
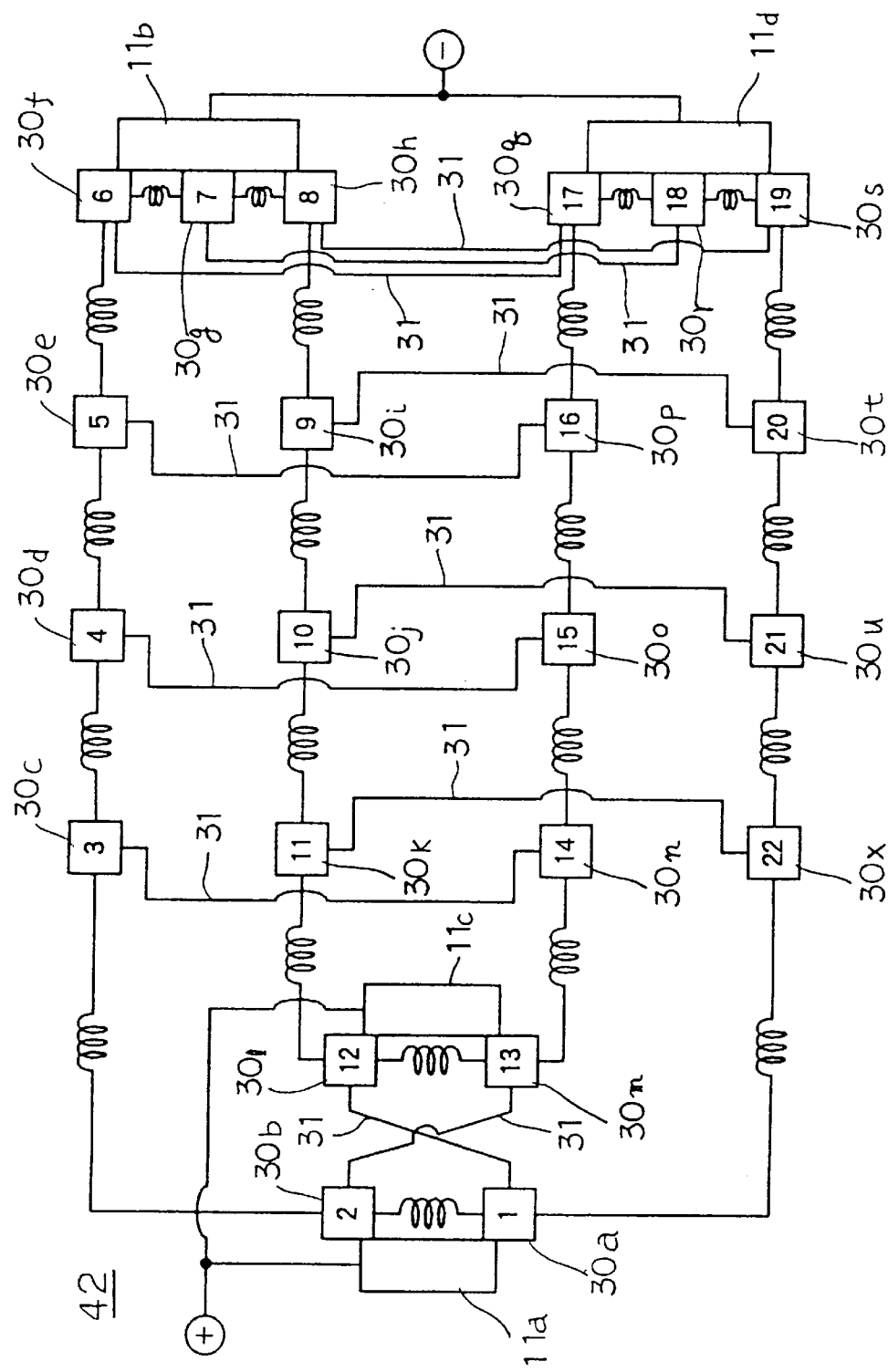
FIG. 16 is an electric circuit diagram for the motor for an electric power steering assembly in FIG. 14.
Figure 17:
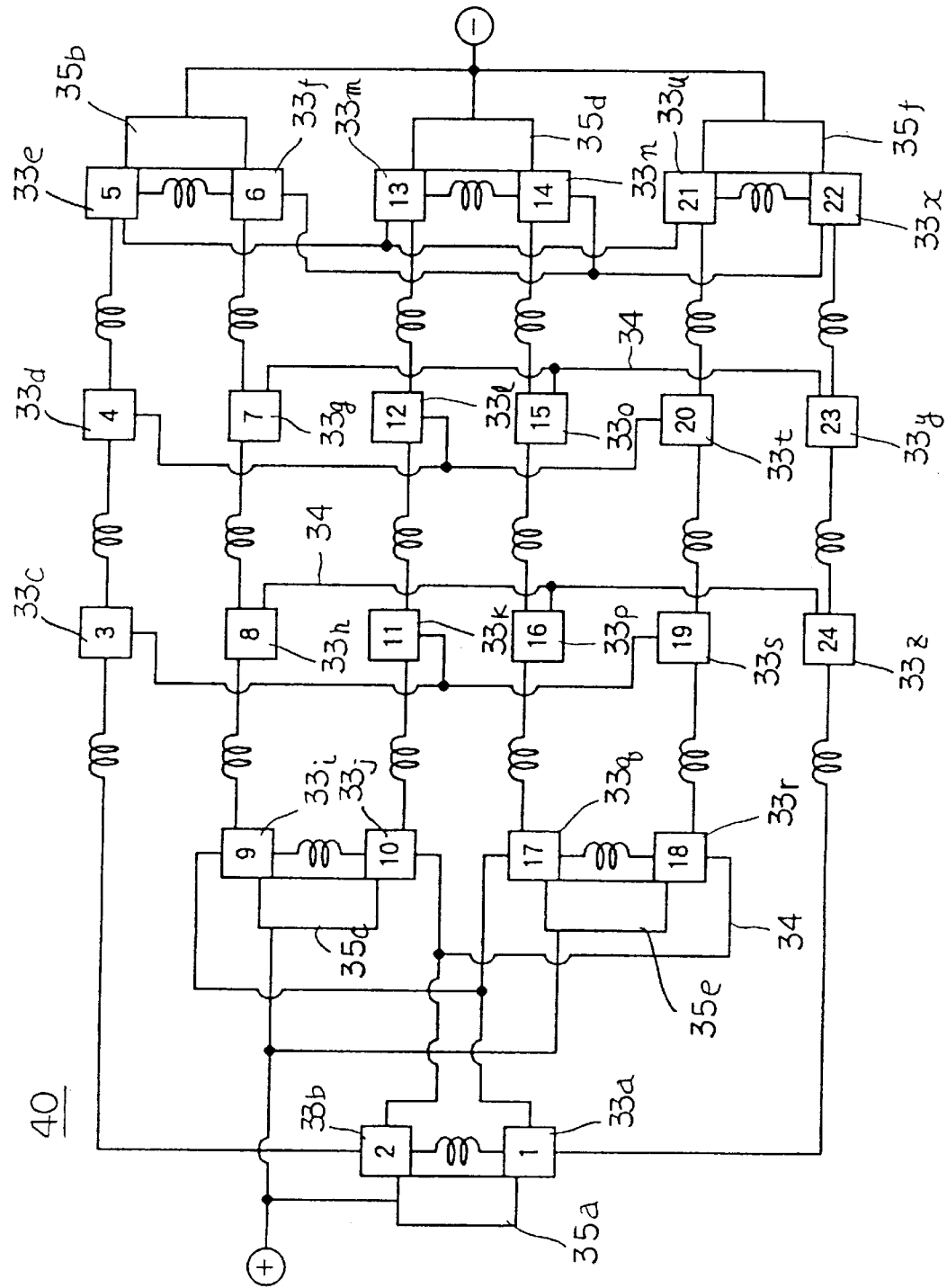
FIG. 17 is an electric circuit diagram for another example of a conventional motor for an electric power steering assembly.
Figure 18:
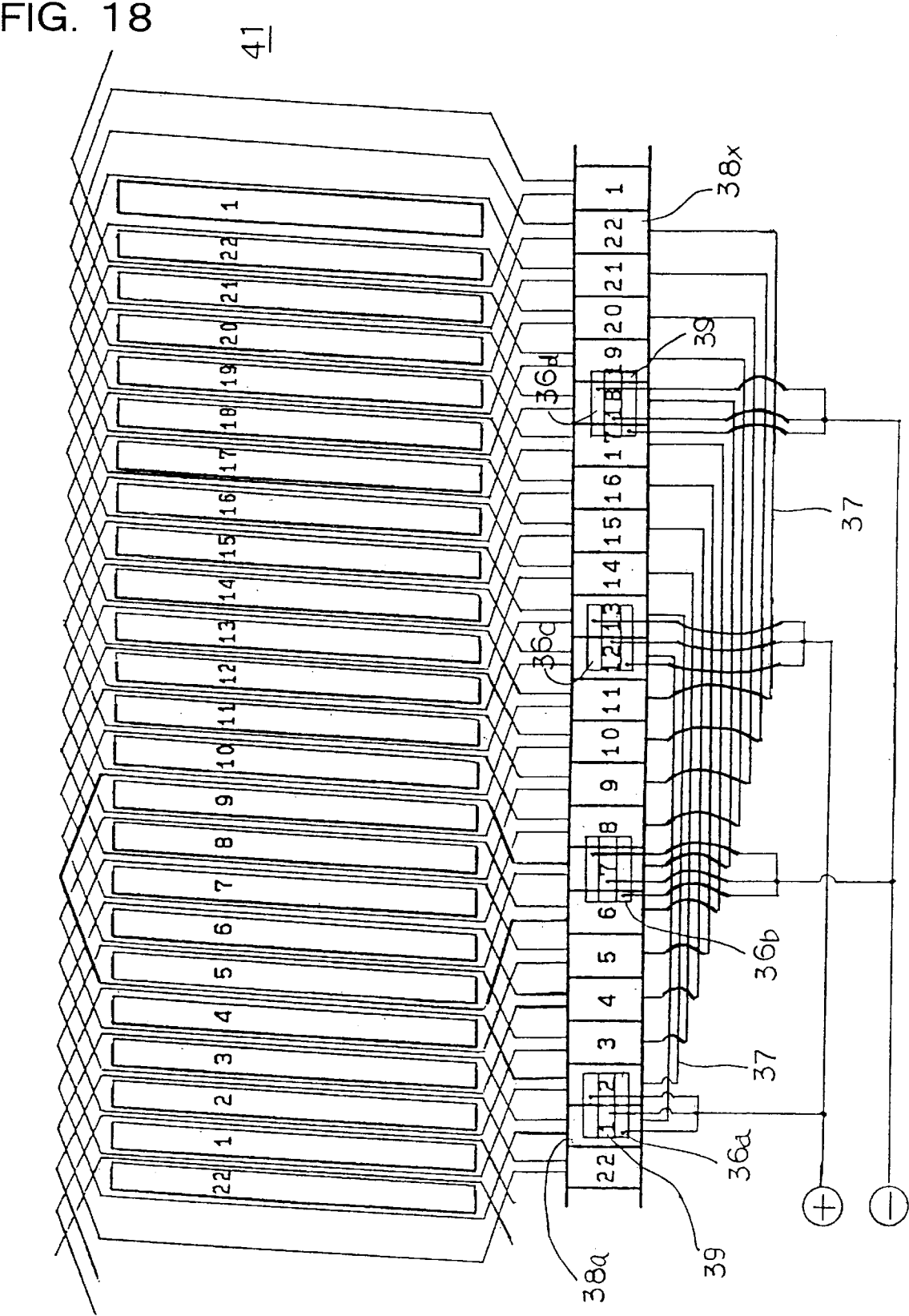
FIG. 18 is a winding diagram for the motor for an electric power steering assembly in FIG. 17.

FIGS. 1 and 2 show the first brush 89a in contact with a first commutator segment 87a and a second commutator segment 87b, and the second brush 89b in contact with a sixth commutator segment 87f, a seventh commutator segment 87g, and an eighth commutator segment 87h. As shown in FIG. 16, in the conventional electric motor 1, the first brush 11a and the third brush 11c are disposed on the positive brush side, and the second brush 11b and the fourth brush 11d are disposed on the negative brush side, but in this embodiment, the first brush 89a is disposed on the positive brush side, and the second brush 89b is disposed on the negative brush side, the number of brushes being reduced from four to two.

Furthermore, when the coverage K being the area covered by the brushes 89a, 89b is defined by (Wb·Ns)/(π·D), where Wb is the width of the brushes 89a, 89b, Ns is the number of commutator segments 87, and D is the diameter of the commutator 88, the coverage K is set at K≦2.

In an electric motor 79 of the above construction, wire of the same diameter and the same material (enamel-coated copper wire) is used for both the equalizing connectors 90 and the wiring 85, the equalizing connectors 90 being in close contact with the end surface of the commutator 88, and the winding 86 is subsequently disposed on the core 84.

The manufacturing procedure in this case is first to fasten the wire onto the hooks of commutator segments 87 which should have the same potential, then to cut the wire. This operation is repeated to connect one end of each of eleven equalizing connectors 90 to each of the hooks 91a to 101a and the other end thereof to each of the hooks 91b to 101b, respectively. Thereafter, the winding 86 is disposed on the core 84 by winding the wire onto the core 84 by a lap winding method by means of the hooks 91a to 101b. Because this series of operations, namely, fastening, cutting, and winding, is performed by a winding machine, it is carried out efficiently.

Then, after the equalizing connectors 90 are physically connected to commutator segments 87 which should have the same electric potential, and the wiring 85 is wound by a lap winding method into each of the slots 83 in the core 84, then each of the hooks 91a to 101b are electrically connected to the equalizing connectors 90 and the wiring 85, respectively, by simultaneous fusing, etc.

In an electric motor 79 of the above construction, there is a total of two brushes 89a, 89b, enabling torque loss and brush noise due to friction and resistance to the sliding of the brushes 89a, 89b to be reduced.

Furthermore, because the number of brushes 89a, 89b is reduced, the probability that the contact between the brushes 89a, 89b and the commutator segments 87 will become unstable is that much less, improving the feel of the steering wheel to the driver by reducing torque ripples as shown in the table below.

TABLE 1

| | Torque ripples (%) |
|---|---|
| 4 brushes | 3.9 |
| 2 brushes | 1.9 |

In addition, in the conventional electric motor 1, current flows by means of the first brush 11a and the third brush 11b, but in this embodiment, current flows by means of the first brush 89a, the amount of current flowing through the brush 89 being twice that of the conventional example. As a result, when current flows from the first commutator segment 87a to a twelfth commutator segment 87l, and current flows from the second commutator segment 87b to a thirteenth commutator segment 87m, for example, there is risk that the voltage drop and amount of heat generated in the equalizing connectors 90 will increase. However, in this embodiment, the equalizing connectors 90 are in close contact with the end surface of the commutator 88, shortening the length of the equalizing connectors 90 connecting the commutator segments 87 to each other, thereby enabling the voltage drop and amount of heat generated in the equalizing connectors 90 to be suppressed and also enabling operating noise to be reduced.

Furthermore, the width Wb of the brushes 89 is set such that the coverage K is less than or equal to 2, reducing the number of coil portions 102 not included in electromagnetic inductance, and increasing the value of the torque generated by the electric motor 79, as well as enabling imbalances in the electromagnetic attraction acting on the armature 81 to be suppressed, and also enabling reductions in the size electric motor and reductions in operating noise.

Embodiment 2

Figure 5:
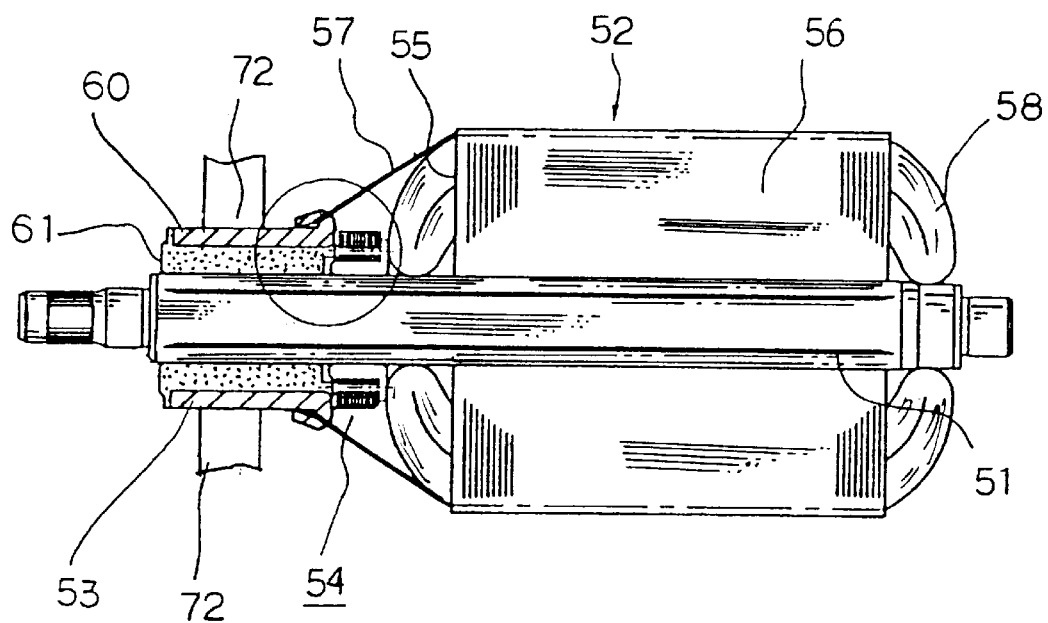
FIG. 5 is a partial cross-section of a motor for an electric power steering assembly according to Embodiment 2 of the present invention.
Figure 6:
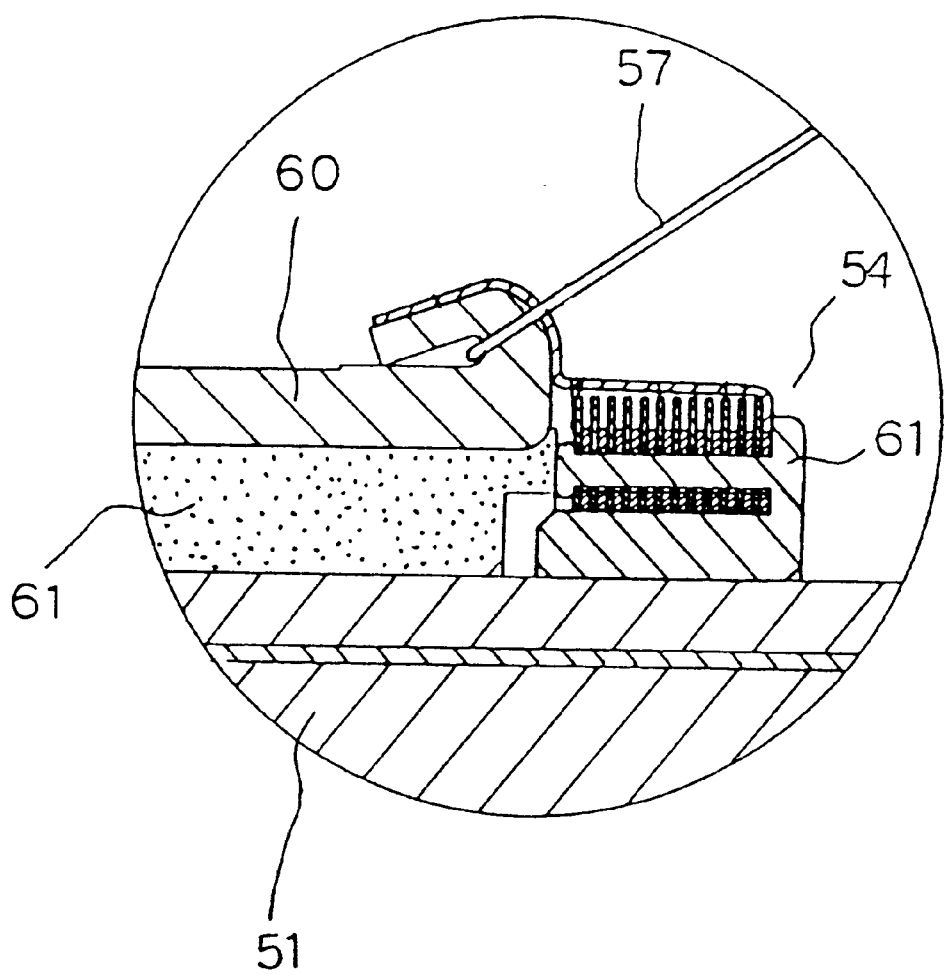
FIG. 6 is an enlargement of part of FIG. 5.
Figure 7B:
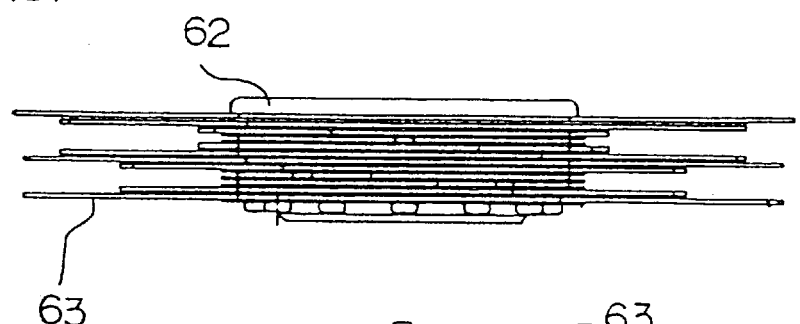
FIG. 7(b) is a side elevation of the equalizer assembly in FIG. 7(a)
Figure 7A:
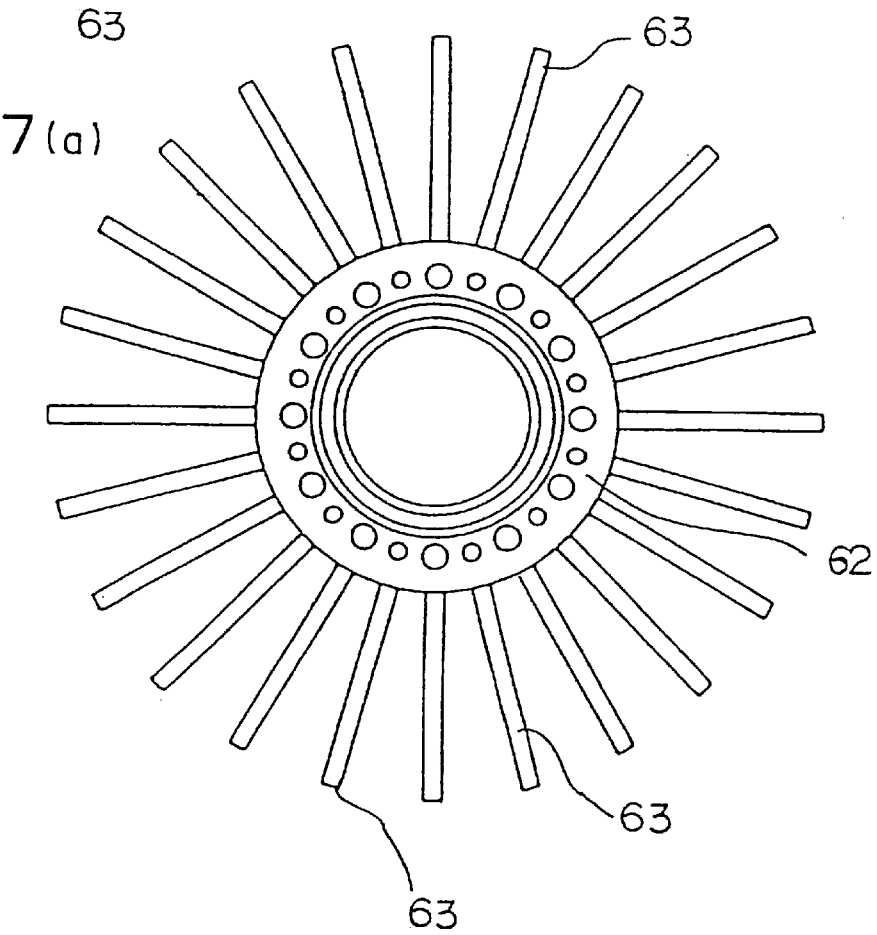
FIG. 7(a) is a developed front elevation of an equalizer assembly.

FIG. 5 is a cross-section of the internal construction of an electric motor 50, FIG. 6 is an enlargement of part of FIG. 5, FIG. 7(a) is a developed front elevation of an equalizer assembly, FIG. 7(b) is a side elevation of the equalizer assembly in FIG. 7(a), FIGS. 8(a) and 8(b) are a front elevation and a side elevation, respectively, of a base, FIG. 9 is front elevation of a terminal which is an equalizing member, and FIG. 10 is a front elevation of an insulating plate.

An electric motor 50 according to this embodiment comprises: an armature 52 secured to a shaft 51; a commutator 53 secured to the shaft 51 for converting a current supplied to the armature 52; an equalizer assembly 54 disposed adjacent to the commutator 53 in the direction of the axis of the commutator 53; and two brushes 72 placed in contact with the surface of the commutator 53 by the elastic force of springs. Four permanent magnets (not shown) are disposed around the outside of the armature 52.

The armature 52 comprises: a core 56 having twenty-four slots 55 formed on the outer circumferential surface thereof extending in the axial direction; and a winding 58 composed of wiring 57 wound by a lap winding method into the slots 55.

The commutator 53 comprises: commutator segments 60 arranged around the circumference thereof each having a hook 59 formed in an end portion thereof; and an insulating resin portion 61 composed of phenol resin for securing the commutator segments 60.

The equalizer assembly 54 comprises: twelve terminals 63 composed of copper plate, etc., which are equalizing members; and twelve insulating plates 64, alternately stacked in layers on a base 62.

The base 62 comprises twelve pins 66 arranged so as to stand equidistantly around the circumference of a toric base main body 65.

Apertures 68 are formed at 24 points spaced equidistantly around the circumference of the annular terminal main body 67 of each of the terminals 63, which are equalizing members. Furthermore, equalizer lead portions 69a, 69b extending radially outwards in opposite directions are disposed on the terminal main body 67.

Apertures 71 are formed at 24 points spaced equidistantly around the circumference of the annular insulating plate main body 70 of each of the insulating plates 64.

The above equalizer assembly 54 is assembled by alternately stacking the twelve terminals 63 and the twelve insulating plates 64 on the base 62. During this process, each successive terminal 63 is rotated by 15 degrees and the terminals 63 are secured to the base 62 by passing the pins 66 of the base 62 through the apertures 68 in the terminals 63. Furthermore, the insulating plates 64 are secured to the base 62 by passing the pins 66 of the base 62 through the apertures 71 in the insulating plates 64. Then, the equalizer assembly 54 is integrated by crimping the ends of the pins 66.

In an electric motor 50 according to the above embodiment, two brushes 72 contact the commutator segments 60, enabling torque loss and brush noise due to friction and resistance to the sliding of the brushes 72 to be reduced.

Furthermore, because the number of brushes 72 is reduced, the probability that the contact between the brushes 72 and the commutator segments 60 will become unstable is that much less, improving the feel of the steering wheel to the driver by reducing torque ripples.

Furthermore, the plurality of terminals 63 are placed in close contact with the end surface of the commutator 53 by means of the insulating plate 64, shortening the length of the terminals 63 connecting the commutator segments 60 to each other, thereby enabling the voltage drop and amount of heat generated in the terminals 63 to be suppressed.

Embodiment 3

Figure 11:
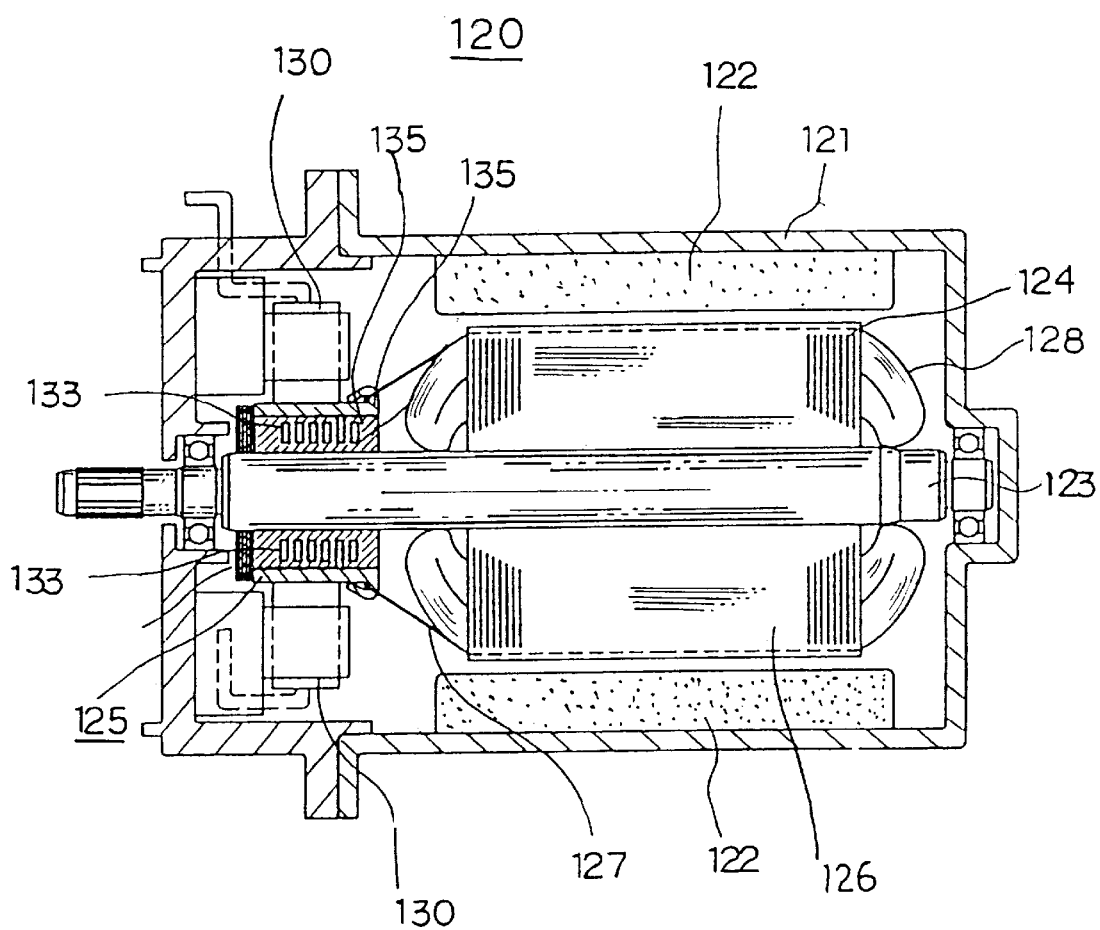
FIG. 11 is a cross-section of a motor for an electric power steering assembly according to Embodiment 3 of the present invention.
Figure 12:
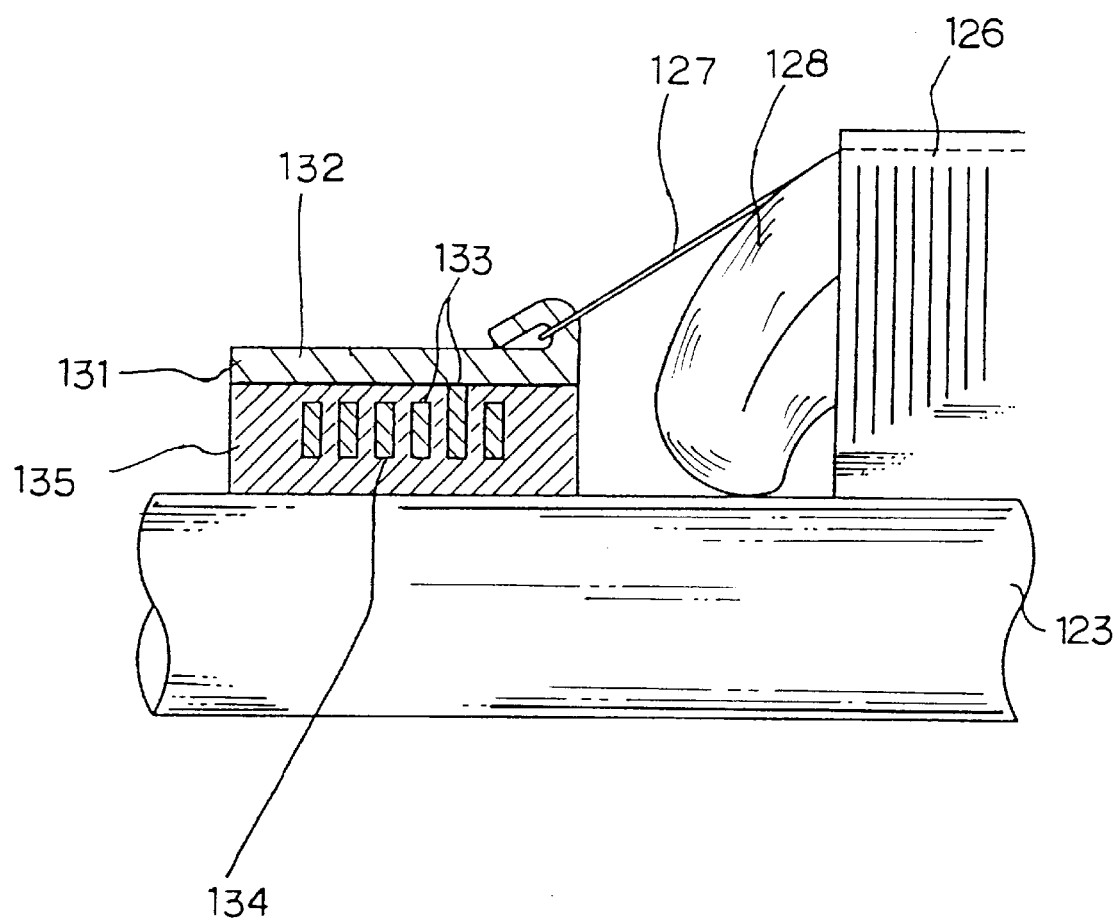
FIG. 12 is an enlargement of part of FIG. 11.

FIG. 11 is a cross-section of an electric motor 120 according to Embodiment 3 of the present invention, and FIG. 12 is an enlargement of part of FIG. 11.

This electric motor 120 comprises: a yoke 121; permanent magnets 122 secured to the inner wall of the yoke 121 to form a magnetic field portion; a shaft 123 disposed inside the yoke 121 so as to be able to rotate freely; an armature 124 secured to the shaft 123; and a commutator assembly 125 disposed at one end of the armature 24 and secured to the shaft 123.

The armature 124 comprises: a core 126 having a plurality of slots extending in the axial direction; and a winding 128 composed of wiring 127 wound by a lap winding method into the slots.

The commutator assembly 125 comprises a commutator 129 and two brushes 130 contacting the surface of the commutator 129. The commutator 129 comprises: a commutator main body 132 composed of a plurality of commutator segments 131 disposed around the circumference of the commutator 129 being electrically connected to a winding 128; an equalizer 134 composed of a plurality of equalizer segments 133 which constitute equalizing members disposed on the inside of the commutator main body 132; and an insulating resin portion 135 which fills the space inside the commutator main body 132. The equalizer segments 133 are made of iron and electrically connect to each other commutator segments 131 composed of copper which should have the same electric potential.

In an electric motor 120 of the above construction, two brushes 130 contact the commutator segments 131, enabling torque loss and brush noise due to friction and resistance to the sliding of the brushes 130 to be reduced.

Furthermore, because the number of brushes 130 is reduced, the probability that the contact between the brushes 130 and the commutator segments 131 will become unstable is that much less, improving the feel of the steering wheel to the driver by reducing torque ripples.

Furthermore, the equalizer 134 is made compact by being disposed on the inside of the commutator main body 132, shortening the length of the equalizer segments 133 connecting the commutator segments 131 to each other, thereby enabling the voltage drop and amount of heat generated in the equalizer segments 133 to be suppressed.

Embodiment 4

Figure 13:
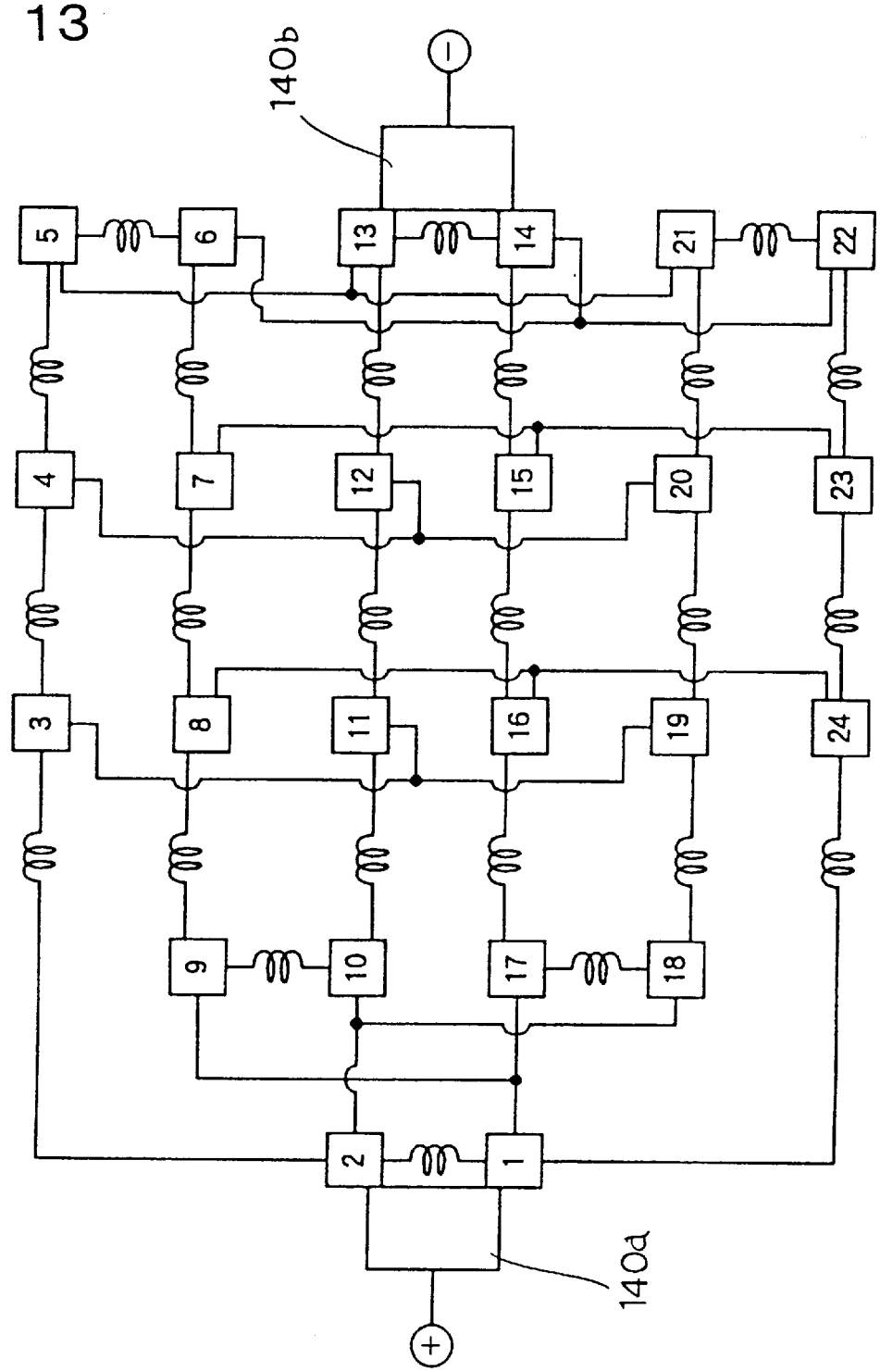
FIG. 13 is an electric circuit diagram for a motor for an electric power steering assembly according to Embodiment 4 of the present invention.
Figure 14:
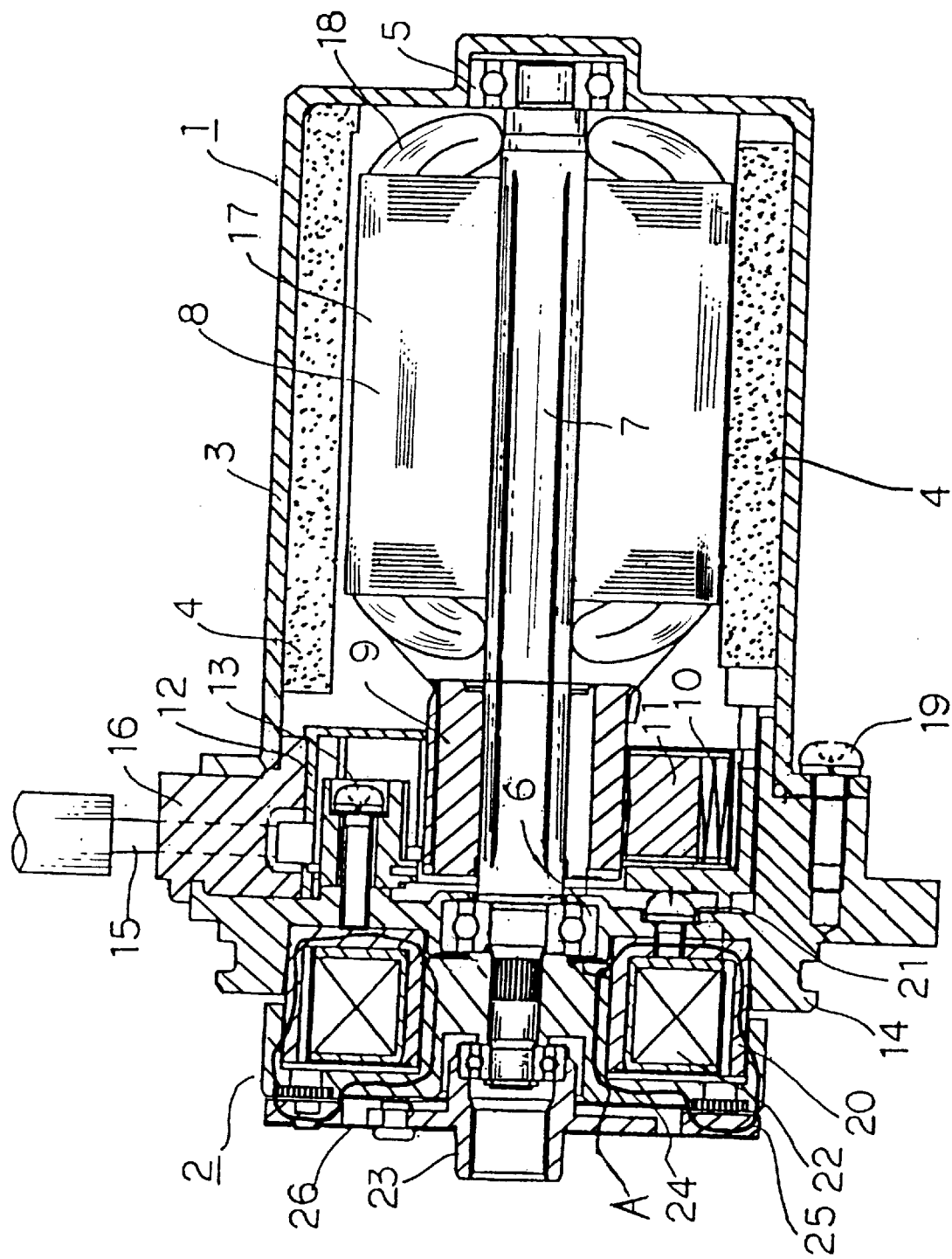
FIG. 14 is a cross-section of a conventional motor for an electric power steering assembly.
Figure 15:
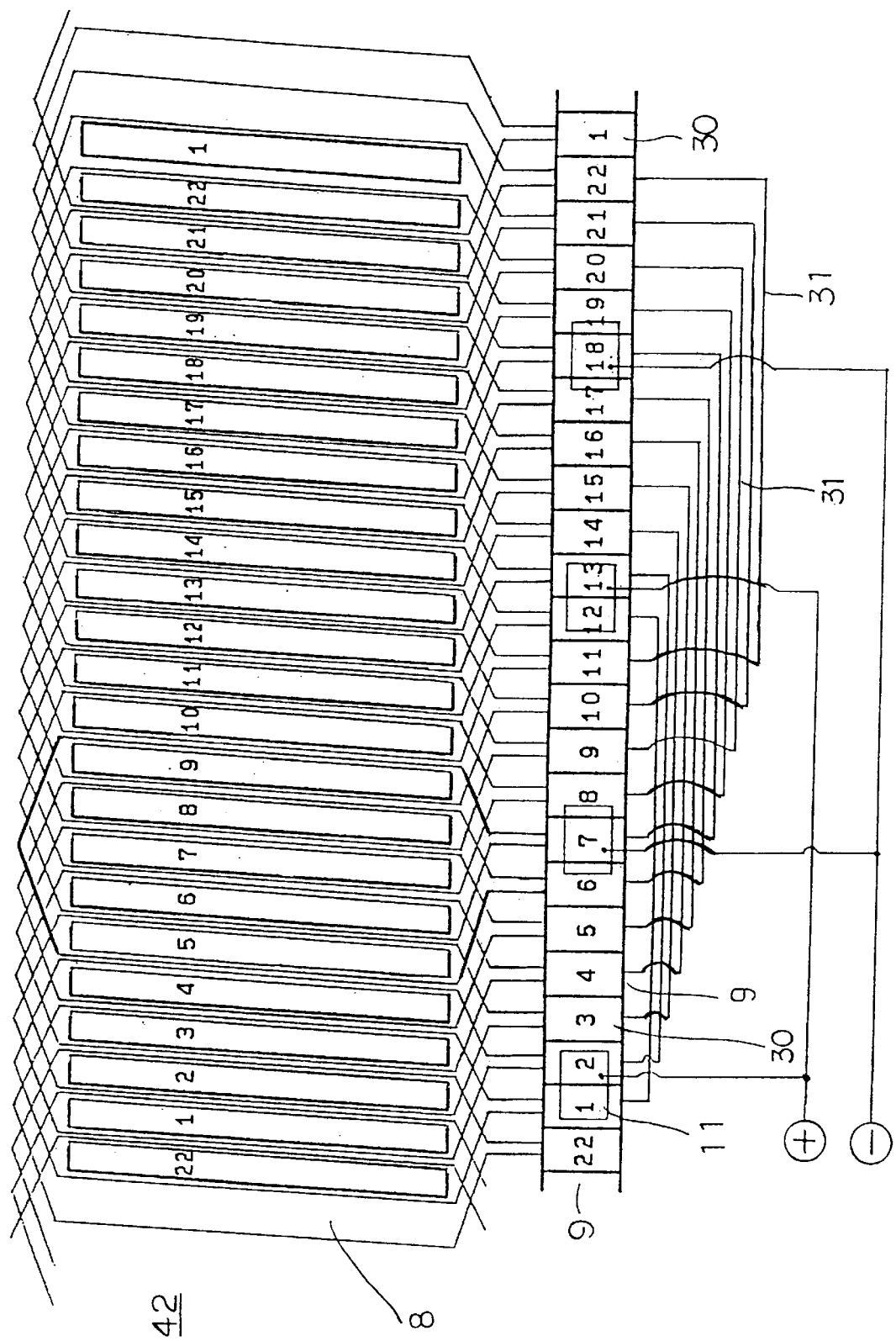
FIG. 15 is a winding diagram for the motor for an electric power steering assembly in FIG. 14.

Furthermore, each of the above embodiments has been explained using a 4-pole, 2-brush, lap-wound electric motor, but as shown in FIG. 13, a lap-wound electric motor having six poles and two brushes 140a, 140b may be used.

As explained above, a motor for an electric power steering assembly according to one aspect of the present invention comprises: a yoke; a multi-polar magnetic field portion composed of at least four poles secured to the inner wall of the yoke; a shaft disposed within the yoke so as to be able to rotate freely; an armature secured to the shaft having a winding constructed by lap winding wiring into slots formed on the outer circumferential surface of a core so as to extend in the axial direction thereof; a commutator comprising a plurality of commutator segments secured to an end portion of the shaft; brushes disposed singly on the positive side and the negative side of the commutator so as to contact the surface thereof; and equalizing members connecting the commutator segments which should have the same electric potential to each other. Therefore, the number of brushes is reduced to two, torque loss and brush noise due to friction and resistance to the sliding of the brushes can be reduced.

Furthermore, because the number of brushes is reduced, the probability that the contact between the brushes and the commutator segments will become unstable is that much less, improving the feel of the steering wheel to the driver by reducing torque ripples.

According to one form of a motor for an electric power steering assembly, the equalizing members may be disposed in close proximity to an end surface of the commutator. Therefore, the length of the equalizer members connecting the commutator segments to each other can be shortened, enabling the voltage drop and amount of heat generated in the equalizer members to be suppressed.

According to another form of a motor for an electric power steering assembly, the equalizing members may be an integral part of the wiring of the winding. Therefore, the number of parts can be reduced and the connection of the equalizing members and the winding of the wiring can be performed continuously, increasing productivity.

According to still form of a motor for an electric power steering assembly, the equalizing members may be plurally stacked in layers in the axial direction of the shaft with insulating plates disposed therebetween. Therefore, shorting between the equalizing members can be reliably prevented.

According to one form of a motor for an electric power steering assembly, the equalizing members are plurally stacked in layers in the axial direction of the shaft inside a cylindrical commutator main body composed of a plurality of commutator segments arranged circumferentially, as well as being secured by an insulating resin portion disposed in a space portion inside the commutator main body. Therefore, the entire body is made more compact and the equalizing members are insulated from each other by an insulating resin portion, preventing shorting.

According to another form of a motor for an electric power steering assembly, the coverage K may be less than or equal to 2, when the coverage K is defined by $K=(Wb \cdot Ns)/(\pi \cdot D)$, where Wb is the width of the brushes, Ns is the number of the commutator segments, and D is the diameter of the commutator. Therefore, winding portions not included in electromagnetic inductance are reduced and the value of the torque generated by the electric motor is increased, enabling imbalances in the electromagnetic attraction acting on the armature to be suppressed, and also enabling reductions in operating noise.

According to still another form of a motor for an electric power steering assembly, the wiring may be composed of enamel-coated round wire. Therefore, mechanization of the process of winding the wiring onto the core is facilitated, making mass production of the armature possible, thereby reducing manufacturing costs.

According to another form of a motor for an electric power steering assembly, the magnetic field portion may comprise a plurality of permanent magnets disposed so as to be spaced around the inner wall of the yoke. Therefore, size can be reduced, the assembly operation can be improved, and costs can be reduced.

What is claimed is:

1. A motor for an electric power steering assembly comprising:

a yoke;

a multi-polar magnetic field portion composed of at least four poles secured to the inner wall of said yoke;

a shaft disposed within said yoke so as to be able to rotate freely;

an armature secured to said shaft having a winding wiring into slots formed on the outer circumferential surface of a core so as to extend in the axial direction thereof;

a commutator comprising a plurality of commutator segments secured to an end portion of said shaft;

a first brush and a second brush disposed singly on the positive side and the negative side of said commutator so as to contact the surface thereof; and equalizing members connecting said commutator segments which should have the same electric potential to each other, wherein a coverage area K is less than or equal to 2, when said coverage area K is defined by $$K=(Wb \cdot Ns)/(\pi \cdot D),$$

where Wb is the width of the first and second brushes, Ns is the number of said commutator segments, and D is the diameter of said commutator.

2. The motor for an electric power steering assembly according to claim 1 wherein said equalizing members are disposed in close proximity to an end surface of said commutator.

3. The motor for an electric power steering assembly according to claim 1 wherein said equalizing members are an integral part of said wiring of said winding.

4. The motor for an electric power steering assembly according to claim 2 wherein said equalizing members are plurally stacked in layers in the axial direction of said shaft with insulating plates disposed therebetween.

5. The motor for an electric power steering assembly according to claim 1 wherein said equalizing members are plurally stacked in layers in the axial direction of said shaft inside a cylindrical commutator main body composed of a plurality of commutator segments arranged circumferentially, as well as being secured by an insulating resin portion disposed in a space portion inside said commutator main body.

6. A motor for an electric power steering assembly comprising:

a yoke;

a multi-polar magnetic field portion composed of at least four poles secured to the inner wall of said yoke;

a shaft disposed within said yoke so as to be able to rotate freely;

an armature secured to said shaft having a winding constructed by lap winding wiring into slots formed on the outer circumferential surface of a core so as to extend in the axial direction thereof;

a commutator comprising a plurality of commutator segments secured to an end portion of said shaft;

a first brush and a second brush disposed singly on the positive side and the negative side of said commutator so as to contact the surface thereof;

equalizing members connecting said commutator segments which should have the same electric potential to each other;

wherein a (the) coverage area K is less than or equal to 2, when said coverage area K is defined by $$K=(Wb \cdot Ns)/(\pi \cdot D),$$

where Wb is the width of said first and second brushes, Ns is the number of said commutator segments, and D is the diameter of said commutator.

7. The motor for an electric power steering assembly according to claim 1 wherein said wiring is composed of enamel-coated round wire.

8. The motor for an electric power steering assembly according to claim 1 wherein said magnetic field portion comprises a plurality of permanent magnets disposed so as to be spaced around the inner wall of said yoke.

9. The motor of claim 1, wherein said equalizing members are an integral part of said wiring of said winding.

10. The motor of claim 1, wherein said equalizing members comprise a plurality of annular shaped members, each of said annular shaped members having a pair of elements radially extending on opposite sides of said annular shaped member, wherein said annular members are stacked with pairs of radially extending elements displaced from each other, and each of said annular members being insulated from another.

* * * * *